Dec. 14, 1926.

C. JOHNSON

SANDING DEVICE FOR VEHICLES

Filed July 5, 1924      2 Sheets-Sheet 1

1,610,790

Inventor
Clarence Johnson,
By George Heideman
Attorney

Witnesses

Dec. 14, 1926.                                             1,610,790
C. JOHNSON
SANDING DEVICE FOR VEHICLES
Filed July 5, 1924      2 Sheets-Sheet 2
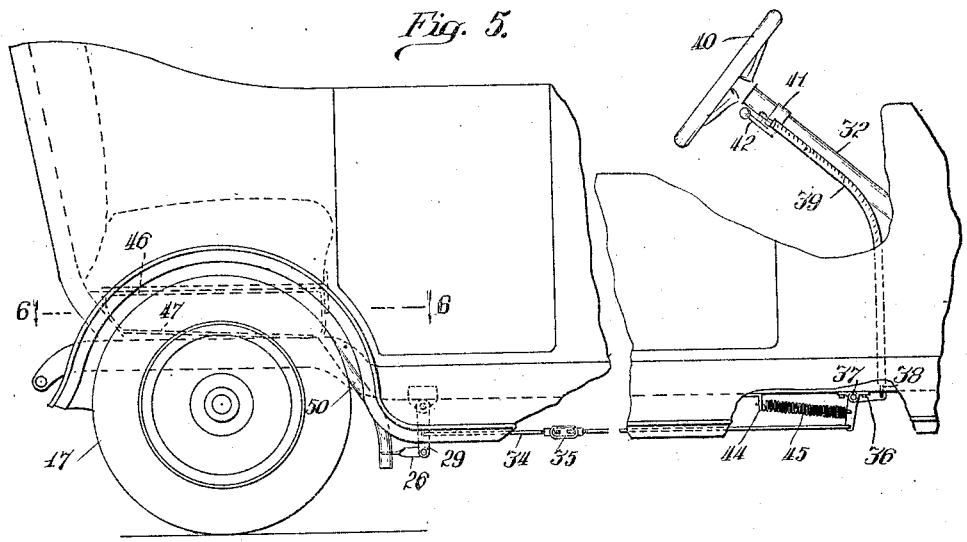
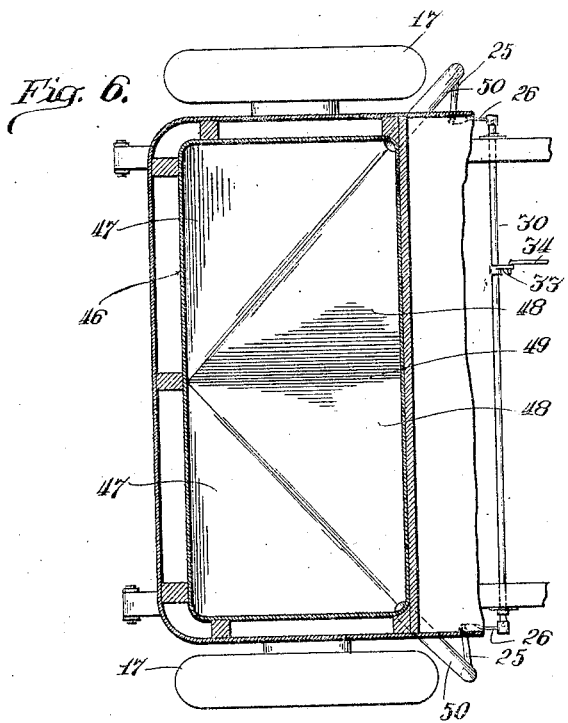
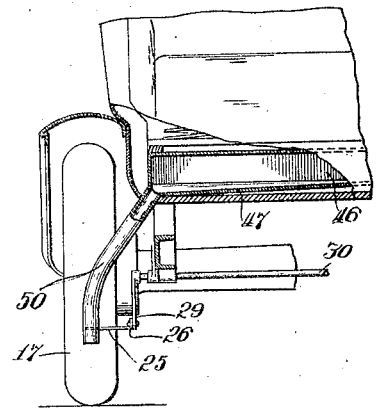
Witnesses
Milton Lenoir
H. O. Florell
Inventor
Clarence Johnson
By George Heedman
Attorney Patented Dec. 14, 1926.

1,610,790

UNITED STATES PATENT OFFICE.

CLARENCE JOHNSON, OF CHICAGO, ILLINOIS.

SANDING DEVICE FOR VEHICLES.

Application filed July 5, 1924. Serial No. 724,208.

My invention relates to a sanding device more especially entended for motor driven vehicles, namely automobiles, trucks and the like; the invention having for its object the provision of a device which may be readily installed on the automobile or truck and which may be controlled by means operable from the seat of the driver, whereby a suitable quantity of sand will be scattered forward of the rear or driving wheels of the automobile or truck in order to provide traction when slippery road conditions are encountered.

The objects and advantages of my invention will be more readily comprehended from the detailed description of the accompanying drawings, wherein:

Figure 5 illustrates the application of my invention to an automobile, a portion whereof is shown in elevation with parts broken away; while my improved means is partially shown in dotted lines beneath the automobile body.

Figure 6 is a cross sectional view taken substantially on the line 6—6 of Figure 5 looking downwardly.

Figure 7 is a detail vertical sectional view through one side of the rear end of an automobile provided with my improved device.

Figure 1:
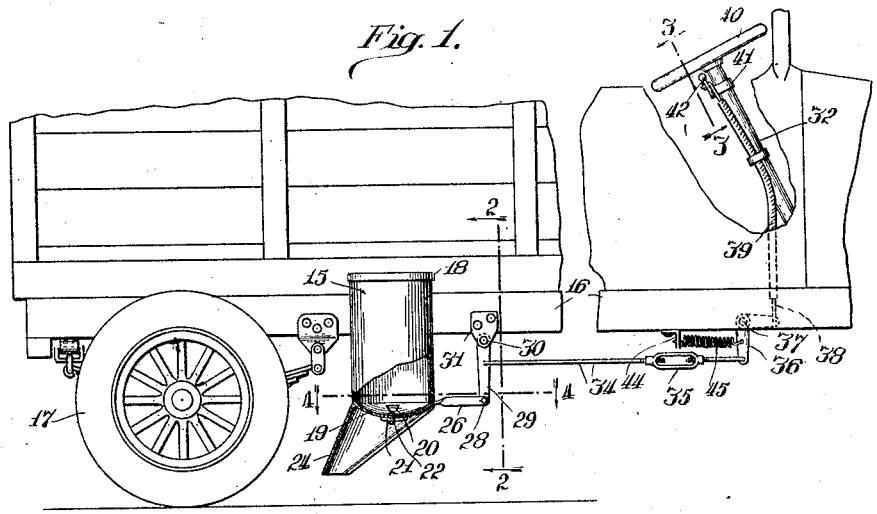
Figure 1 illustrates the application of my invention to an automobile truck of which a portion is shown in side elevation, with certain portions broken away, and a part of my device shown in elevation and in section.
Figure 2:
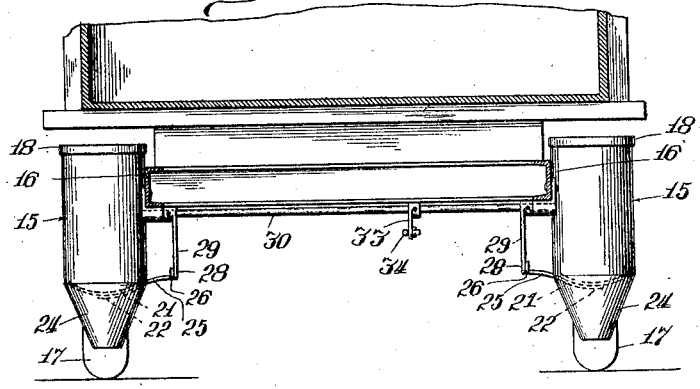
Figure 2 is a vertical sectional view, taken substantially on the line 2—2 of Figure 1 looking in the direction of the arrows.

In the exemplification of the invention as disclosed in Figures 1 and 2, it has been shown applied to a truck, of which only a portion is shown in side elevation; and the invention comprises receptacles 15, 15, of any suitable construction which are intended to be properly secured to the side frame members 16 of the chassis; that is to say a receptacle is to be secured to each side frame member of the chassis at a point slightly forward of the traction or rear wheels 17 of the truck.

The receptacles are each preferably provided with a suitable cover or lid 18 and the receptacles are of a size adapted to contain a sufficient quantity of suitable sand. The receptacles are also each provided with a bottom 19, which is preferably dished or concave and provided with one or more suitable sized openings as at 20 in Figure 4 for the passage of the sand when the opening 20 has been uncovered by proper operation of a sector shaped plate 21 which is pivotally mounted at the point 22 to the lower side of the bottom 19. The sector shaped plate 21 is also provided with one or more openings as at 23 (in keeping with the number of openings in bottom 19) adapted to be brought into register with the opening 20 in the bottom 19 when plate 21 has been properly oscillated.

The bottom of each receptacle is provided with a tapered and somewhat rearwardly sloping spout or conduit 24, terminating at a suitable distance above the ground and forward of the rear or traction wheels of the truck; the spouts or conduits 24 having orifices formed to discharge the sand in a sufficiently spread manner forwardly of the wheels.

The plate 21 of each receptacle is provided with an arm 25 extending laterally through a suitable opening in the side of the bottom portion or spout of the receptacle; and the arm 25 has a link 26 pivotally connected thereto at 27. It will be understood that the plates 21 of both receptacles 15 are so arranged as to have the arms 25 thereof extend toward the longitudinal center line of the truck. Each link 26 is in turn pivotally connected at 28 to an arm 29 which is rigidly secured to a rocker shaft 30 mounted in suitable brackets 31 secured to the side frame members of the chassis; the arms 29 being secured to the rocker shaft 30 so as to rotate therewith.

The rocker shaft 30, at a point preferably somewhat in alignment with the steering column 32 of the truck, is provided with a short arm 33 rigidly secured thereto and the lower end of this arm in turn is connected to a reach-rod 34, which may be provided with a turn-buckle connection as at 35 to permit of adjustments. The forward end of the reach-rod 34 is pivotally connected in the depending arm of a bell-crank lever 36 which latter is oscillatable on a stud or rod 37 secured on the frame of the truck in any suitable manner. The other arm of the bell-crank lever 36 has a pull-rod or cable 38 secured thereto; and this pull-rod is preferably disposed through a flexible tubing 39 which extends upward through an opening in the floor of the truck and is clamped or properly secured to the steering column 32 in any suitable manner so as to have the pull-rod 38, at the upper end extend substantially parallel with the steering column 32 to a point in proximity to the steering wheel 40.

Figure 3:
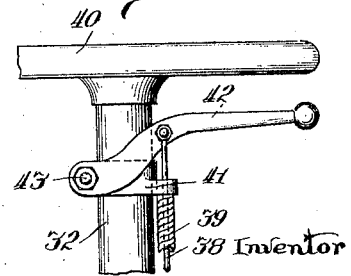
Figure 3 is a detail view in elevation taken substantially on the line 3—3 of Figure 1.

The steering column 32, at a point slightly beneath the steering wheel, is provided with a collar and guide member 41 to which a lever 42 is pivotally secured at 43; and to this lever 42, at a point intermediate of its ends, the pull-rod 38 is secured as shown in Figure 3. The lever 42 is preferably formed so as to have its free end extend into more or less close relation with the steering wheel 40, to enable the operator to grasp lever 42 with his fingers without releasing the steering wheel.

As is apparent from the construction shown, an upward pull on lever 42 will likewise exert upward pull on rod or wire 38 thereby rocking bell-crank lever 36 so as to move the depending arm thereof forwardly and this in turn will exert a pull on pull rod 34 thereby rocking shaft or rod 30 and with it the two links or arms 29 at opposite ends of the rod and opposite sides of the truck. Such actuation of the rocker shaft will move the links or arms 29 forwardly thereby exerting a forward pull on links 26 which will cause the apertured plates 21 of both receptacles 15 to be oscillated forwardly or in clockwise direction as viewed in Figure 4, thus causing the aperture 23 in each plate 21 to be brought into register with the opening 20 in the bottom of each receptacle. This will allow a quantity of the sand to pass through the registering openings down into the spouts 24, to be discharged forward of the rear or traction wheels 17 of the truck.

The truck frame at a suitable point is shown provided with a bracket or lug as at 44 to which one end of a tension spring 45 is secured, while the other end of the spring is secured to the depending arm of the bell-crank lever. The spring 45 normally tends to draw the depending arm of the bell-crank lever rearwardly and therefore in a direction which will induce the pull-rod 33 to rock the rocker shaft with its arm 29 in a direction which will cause the links 26 to move the apertured plates 21 in counter-clockwise direction as viewed in Figure 4, namely in a direction which will move the aperture 23 of each plate 21 out of register with the opening 20 in the bottom of each receptacle and thereby shut off the outflowing sand.

Figure 4:
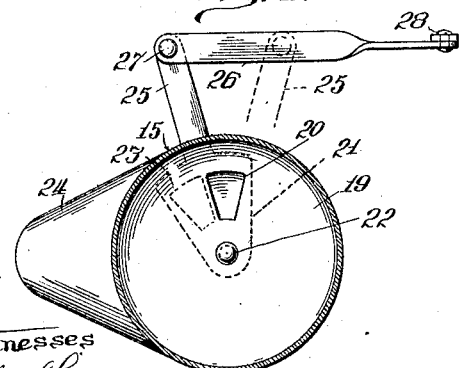
Figure 4 is a detail sectional view taken substantially on the line 4—4 of Figure 1 looking in the direction of the arrows.

In Figures 5 to 7, I illustrate the application of my invention to an automobile. Where my improved device is intended to be applied to an automobile, the supporting structure of the rear seat is formed to provide a receptacle 46 which preferably extends full length of the rear seat. The receptacle is provided with downwardly sloping bottom walls 47 and 48; the wall 48 being bent downwardly from the median line 49 so as to slope in opposite directions and thus divide the receptacle into two sand holding compartments on opposite sides of the median line of the vehicle. The walls 47 and 48, in addition to sloping downwardly toward each other, are also made to slope downwardly toward the front side of the receptacle 46 so that the lowest point in both compartments will be at the juncture of the bottom walls 47 and 48 adjacent to the forward corners of the receptacle 46 and therefore adjacent to the sides of the vehicle. The forward corners of the receptacle are each provided with an outlet conduit 50 extending slightly forwardly and downwardly, as well as outwardly or in a lateral direction so as to be disposed forward of the rear wheels 17 and at proper distance removed from the wheels, as more clearly shown in Figure 5. The conduits 50, 50, which are of suitable diameter, are each provided adjacent to the lower ends thereof with a bottom which may be substantially similar to bottom 19, as shown in Figure 4, except as to dimensions and that the bottoms in the conduits 50 need not be dished or concaved; and these bottoms are in turn each provided with a plate pivotally secured therebeneath substantially similar to plate 21 and each provided with an arm 25; all connected up and operating in a manner similar to that previously described.

The discharging conduits 50 may be arranged so as to extend beneath the mud guards of the automobile and therefore be practically hidden from view; and the mechanism may be operated by a lever 42 and cable or wire arranged within the flexible tubing 39, all as previously shown and described.

I have shown what I believe are simple adaptations of my invention to either a truck or an automobile and have described the exemplifications in terms employed merely as terms of description and not as terms of limitation, as structural modifications are possible and may be made without, however, departing from the spirit of my invention.

What I claim is:

1. A sanding device, comprising sand holding compartments adjacent to the rear wheels of a motor driven vehicle, said compartments being each provided with a conduit for delivering the sand forward of the rear wheels of the vehicle, an apertured bottom in said compartments, an apertured plate pivotally secured beneath each bottom adapted to be oscillated so as to move the aperture of the plate into register with the aperture of the bottom, a rocker shaft disposed transversely of the vehicle, links intermediate of each apertured plate and said rocker shaft whereby the plates are simultaneously oscillated when said rocker shaft is operated, and spring-controlled means operable from the steering wheel of the vehicle whereby the rocker shaft may be actuated so as to move the apertures of both plates into register with the apertures in the bottoms of both compartments.

2. In a sanding device of the character described, sand holding receptacles adjacent to the rear end of the vehicle, conduits for conveying the sand from said receptacles to points forward of the rear wheels of the vehicle, oscillatory closure means for each conduit, a rocker shaft disposed transversely of the vehicle, link mechanism intermediate of each closure means and said rocker shaft whereby the closure means are simultaneously actuated, a spring-controlled bell-crank lever, a reach rod intermediate of said bell-crank lever and the rocker shaft, and hand operated mechanism secured to the steering column of the vehicle and operatively connected with said bell-crank lever whereby the closure means may be moved into sand delivering positions.

3. In a sanding device of the character described, sand-holding means adapted to deliver sand at points immediately forward of the rear wheels of a motor driven vehicle, closure means for the delivery ports of the sand-holding means, means disposed transversely of the vehicle adjacent to said closure means and having pivotal connection with both closure means, vertically movable means beneath the forward part of the vehicle and operatively connected with said transversely disposed means, and spring-controlled and vertically movable means operable from the steering column of the motor driven vehicle whereby upward movement of the last mentioned means will cause the closure means to be simultaneously moved into sand delivering position.

4. In a sanding device of the character described, sand holding compartments disposed at the rear end of the vehicle, each compartment being provided with a delivering end for conveying the sand to a point immediately forward of the rear wheels, oscillatory closure means for the delivery ends of said compartments, a rocker shaft disposed transversely beneath the vehicle, each end of the rocker shaft being provided with links operatively connected with the adjacent closure means, a spring-controlled bell-crank lever secured beneath the forward end of the vehicle, an adjustable reach-rod between the bell-crank lever and the rocker shaft, a pull rod secured to the bell-crank lever and to the steering column of the vehicle, and a hand lever pivotally mounted on the steering column and connected with said pull rod.

CLARENCE JOHNSON.